United States Patent [19]

Inoue

[11] Patent Number: 4,721,363
[45] Date of Patent: Jan. 26, 1988

[54] TEMPERATURE CONTROL DEVICE FOR LIQUID CRYSTAL OPTICAL SHUTTER

[75] Inventor: Hideaki Inoue, Tokyo, Japan

[73] Assignees: Casio Computer Co., Ltd.; Casio Electronics Manufacturing Co., Ltd., both of Tokyo, Japan

[21] Appl. No.: 918,107

[22] Filed: Oct. 14, 1986

[30] Foreign Application Priority Data

Oct. 29, 1985 [JP] Japan .................. 60-243743

[51] Int. Cl.⁴ ............... G02F 1/13; H03K 3/26
[52] U.S. Cl. .................... 350/331 T; 307/310
[58] Field of Search .............. 350/331 T; 307/310

[56] References Cited
U.S. PATENT DOCUMENTS

| | | | |
|---|---|---|---|
| 4,128,311 | 12/1978 | Smith et al. | 350/331 T |
| 4,386,836 | 6/1983 | Aoki et al. | 350/331 T |
| 4,493,984 | 1/1985 | Yamauchi | 219/501 |
| 4,682,857 | 7/1987 | Tang | 350/331 T |
| 4,687,956 | 8/1987 | Itoh et al. | 350/310 |

FOREIGN PATENT DOCUMENTS 52-101058 8/1977 Japan .
57-117980 7/1982 Japan .
58-103022 7/1983 Japan .

*Primary Examiner*—Stanley D. Miller
*Assistant Examiner*—Trong Quang Phan
*Attorney, Agent, or Firm*—Nixon & Vanderhye

[57] ABSTRACT a temperature control device for a liquid crystal optical shutter allows information writing on a photosensitive body such that a plurality of microshutters are opened/closed to selectively transmit light from a light source onto the surface of the photosensitive body. The ambient temperature near the liquid crystal optical shutter is detected by a thermistor. The temperature control device includes a first temperature controller for causing a thermistor to detect the ambient temperature near the liquid crystal optical shutter and for variably controlling an energization ratio of the heater for heating the liquid crystal optical shutter, and a second temperature controller for controlling energization of the heater at an energization ratio different from that of the first temperature controller.

13 Claims, 13 Drawing Figures

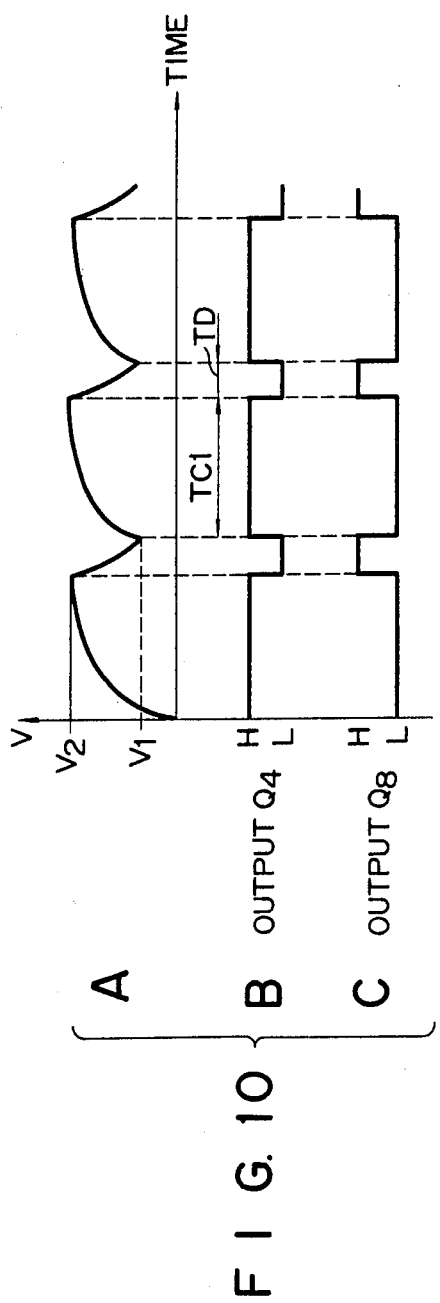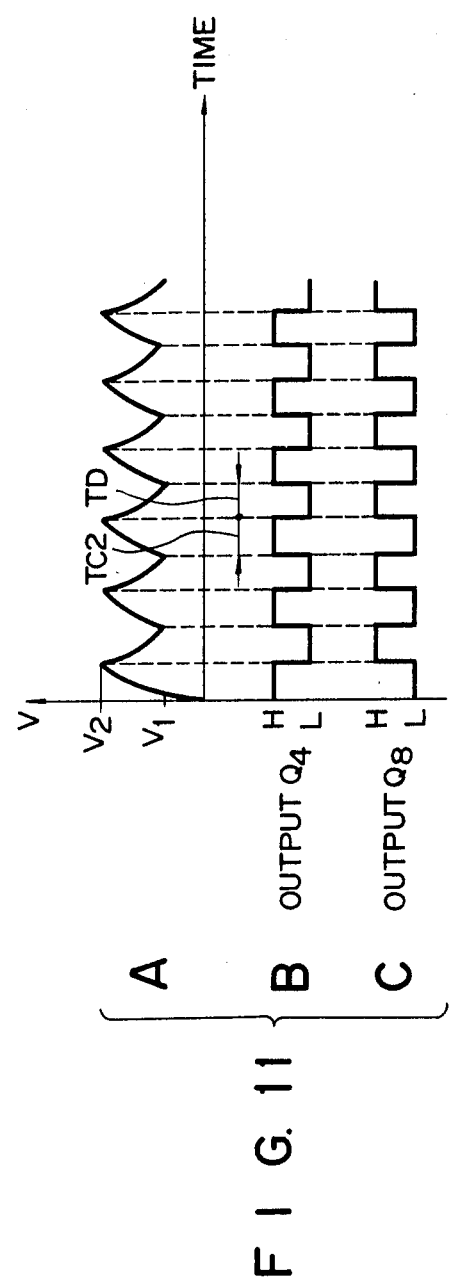

F I G. 12 A
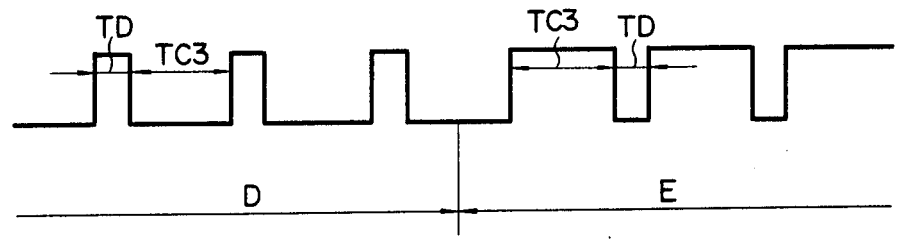
F I G. 12 B
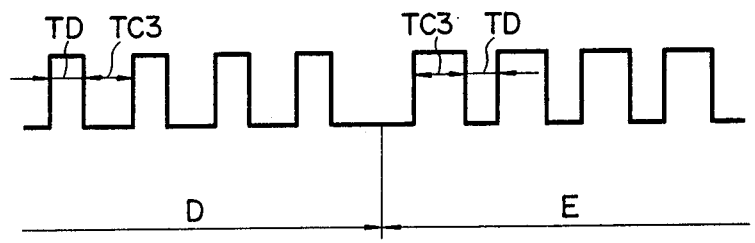

TEMPERATURE CONTROL DEVICE FOR LIQUID CRYSTAL OPTICAL SHUTTER

BACKGROUND OF THE INVENTION

The present invention relates to a temperature control device for a liquid crystal optical shutter in a recording apparatus using an optical recording scheme utilizing an electrooptical effect.

Various types of optical recording apparatuses using an optical transducer element such as a laser, an OFT, an LED (Light-Emitting Diode), and an LCD (Liquid Crystal Display) have been proposed. Among these apparatuses, a recording apparatus using a liquid crystal optical shutter has received a great deal of attention since it has many advantages such as high printing quality, high-speed operation, and low noise. A conventional recording apparatus of this type uses a liquid crystal optical shutter as a recording head. The optical shutter is selectively opened/closed on the basis of the recording signal to selectively transmit light from a light source through the optical shutter, thereby writing information on a photosensitive body.

Two-frequency driving is known as a liquid crystal optical shutter driving method utilizing inversion of dielectric anisotropy of liquid crystal molecules upon changes in frequency of the electric field. As shown in FIG. 1, the dielectric anisotropy of the liquid crystal is positive at a frequency lower than zero-crossing frequency $f_c$. However, when the frequency is higher than frequency $f_c$, the dielectric anisotropy is inverted to the negative polarity. If frequency $f_L$ lower than frequency $f_c$ is used as a frequency for an electric field, liquid crystal molecules are oriented parallel to the electric field and the optical shutter can be open. However, if frequency $f_H$ higher than frequency $f_c$ is used as a frequency for the electric field, liquid crystal molecules are aligned in a direction perpendicular to the electric field, thereby closing the optical shutter. By controlling the ON/OFF operation of the optical shutter, it can suitably serve as a recording head for the photosensitive body.

The dielectric anisotropy of the liquid crystal is very sensitive to its viscosity and therefore tends to greatly change according to changes in temperature. If the viscosity of a liquid crystal is changed, $f_c$ is changed accordingly. For example, if the temperature is changed from 20° C. to 40° C., zero-crossing frequency $f_c$ is changed from, e.g., 5 kHz to 46 kHz, and the liquid crystal shutter cannot serve as an optical shutter. For this reason, constant temperature control is required for the optical shutter. Furthermore, if a liquid crystal has a low viscosity, behavior of liquid crystal molecules is fast and high-speed operation can be expected. For this reason, the liquid crystal shutter is used at a relatively high temperature.

A typical conventional two-position control type temperature control device for controlling a liquid crystal shutter is illustrated in FIG. 2.

Referring to FIG. 2, reference symbol H denotes a heater arranged in a liquid crystal optical shutter (not shown). Energization of heater H is controlled such that switching of transistor $Q_B$ is controlled in response to an output from comparator $Q_A$. In this manner, the temperature of the liquid crystal optical shutter is controlled. More specifically, voltage $V_N$ obtained by causing thermistor TH and resistor $R_A$, both of which are arranged in the liquid crystal optical shutter, to divide power source voltage $V_{10}$ is input to noninverting terminal $I_N$ of comparator $Q_A$ to detect a temperature of the liquid crystal optical shutter. At the same time, voltage $V_I$ obtained by causing resistors $R_B$ and $R_C$ to divide voltage $V_{10}$ is input to inverting terminal $I_I$ of comparator $Q_A$. If the temperature of the liquid crystal optical shutter is low, thermistor TH has a high resistance. If $V_N > V_I$, then an output from comparator $Q_A$ goes high to turn on transistor $Q_B$, so that heater H is energized to heat the liquid crystal optical shutter. However, if the temperature of the liquid crystal optical shutter becomes high, thermistor TH has a low resistance. If $V_N < V_I$, then the output from comparator $Q_A$ goes low to deenergize heater H, so that heater H is no longer heated. Such a two-position control type temperature control device is described in Japanese Patent Disclosure (Kokai) No. 52-101058.

In the conventional temperature control device described above, since heater H is energized when the temperature of the liquid crystal optical shutter is lower than the reference temperature and is deenergized when the shutter temperature is higher than the reference temperature, sufficient temperature control precision cannot be obtained, as shown in FIG. 3. In particular, when an ambient temperature is changed, stable operation cannot be performed. For this reason, the operating characteristics of the liquid crystal optical shutter, that is, the opening of the shutter, becomes unstable. A latent potential becomes nonuniform upon writing of information on the photosensitive body, variations in image density occur during development, and image quality is thus degraded.

Japanese Patent Disclosure No. 57-117980 and U.S. Pat. No. 4,386,836 describe printers whose temperature control is performed upon energization of a heater. However, no prior art apparatuses are found to perform fine temperature control even according to changes in ambient temperature.

Thermistor TH and heater H are formed in contact with, e.g., a glass substrate constituting a liquid crystal optical shutter. The temperature detected by thermistor TH upon energization of heater H is lowered by a temperature of the glass substrate on which heater H is formed. It takes a given period of time to equalize the substrate temperature and the temperature detected by thermistor TH. More specifically, it takes a given period of time to cause heater H to heat the glass substrate and to conduct heat to thermistor TH. The given period of time is prolonged when the ambient temperature of the liquid crystal optical shutter is low. For this reason, when thermistor TH detects a suitable temperature, the actual temperature of the glass substrate contacting heater H exceeds the suitable temperature, thus resulting in overshooting, as indicated by F in FIG. 3. As a result, stable temperature control cannot be achieved.

SUMMARY OF THE INVENTION

The present invention has been made in consideration of the above situation, and has as its object to provide a temperature control device for a liquid crystal optical shutter, which is substantially free from the influence of a structure having thermistor TH and heater H, both of which are formed in contact with a glass substrate, wherein the liquid crystal optical shutter can be controlled with high precision so as to follow variations in ambient temperature even these variations actually occur, so that high printing quality can be expected, and wherein overshooting can be effectively prevented.

In order to achieve the above object of the present invention, there is provided a temperature control device for a liquid crystal optical shutter, comprising: a heater energization control means for receiving a power source voltage, detecting a temperature of the liquid crystal optical shutter, and controlling energization of a heater in the liquid crystal optical shutter according to a detected temperature until the liquid crystal optical shutter reaches a predetermined temperature; a temperature limiting means for receiving the power source voltage and deenergizing the heater when the temperature of the liquid crystal optical shutter exceeds a preset temperature; a first temperature controlling means connected to said temperature limiting means, for detecting an ambient temperature on the basis of a signal from a temperature detector arranged near the liquid crystal optical shutter and for controlling to deenergize the heater in a temperature region exceeding the preset temperature; and a second temperature controlling means, connected to the first temperature controlling means, for generating a control output to prevent energization of the heater when the temperature of said liquid crystal optical shutter exceeds the preset temperature.

In the temperature control device for a liquid crystal optical shutter, as described above, an energization ratio of the heater as a heating means is changed according to changes in ambient temperature, thereby providing very stable temperature control. Since the temperature of the liquid crystal optical shutter is stabilized, the dynamic characteristics of the liquid crystal optical shutter can be stabilized. When information is optically written on the photosensitive body, a uniform latent image potential can be obtained. Variations in image density during development can be prevented, and at the same time high printing quality can be maintained.

Since the energization ratio of the heater is reduced before the liquid crystal optical shutter is heated to the preset temperature, overshooting occurring at the initialization of the device can be completely prevented. As a result, warm-up time can be shortened.

BRIEF DESCRIPTION OF THE DRAWINGS

FIGS. 10A and 10B are timing charts showing the operation of a first temperature controller of FIG. 8 when an ambient temperature is low;

FIG. 10C is a timing chart showing the operation which the second temperature controller shown in FIG. 8 performs when an ambient temperature is low;

FIGS. 11A and 11B are timing charts showing the operation of the first temperature controller of FIG. 8 when an ambient temperature is high;

FIG. 11C is a timing chart showing the operation which the second temperature controller shown in FIG. 8 performs when an ambient temperature is high;

FIG. 12A is a timing chart showing the energization ratio within the possible control range of a second temperature controller of FIG. 8 when an ambient temperature is low in D region; and FIG. 12B is a timing chart showing the energization ratio within the possible control range of the second temperature controller of FIG. 8 when an ambient temperature is high in E region.

DETAILED DESCRIPTION OF THE PREFERRED EMBODIMENT

An embodiment of the present invention will be described with reference to FIGS. 4 to 12B. The arrangement of a recording apparatus using a liquid crystal optical shutter will be described. The arrangement is shown in FIG. 4.

Figure 1:
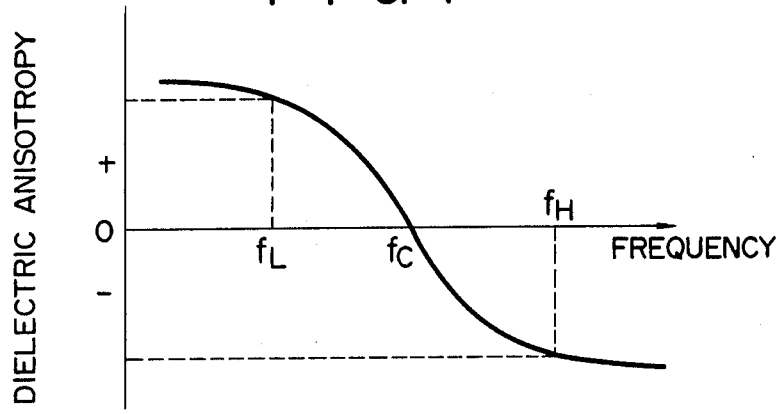
FIG. 1 is a graph showing the dielectric anisotropy of a liquid crystal.
Figure 2:
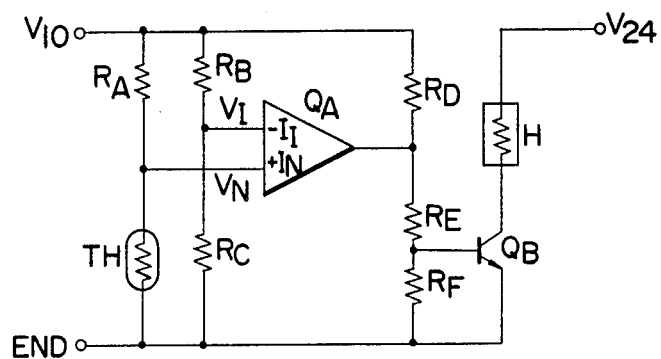
FIG. 2 is a circuit diagram of a conventional two-position control type temperature control device.
Figure 3:
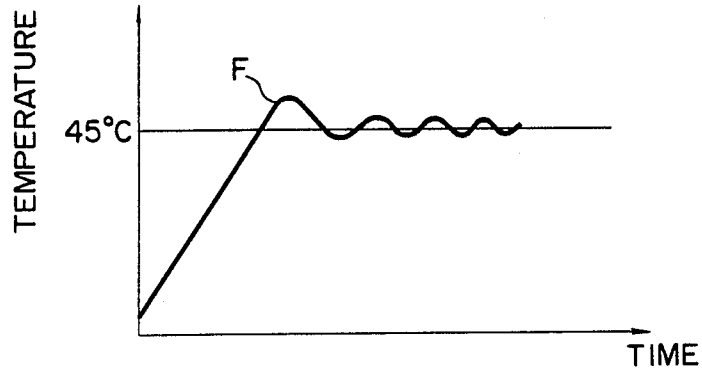
FIG. 3 is a graph showing temperature characteristics of the circuit in FIG. 2.
Figure 4:
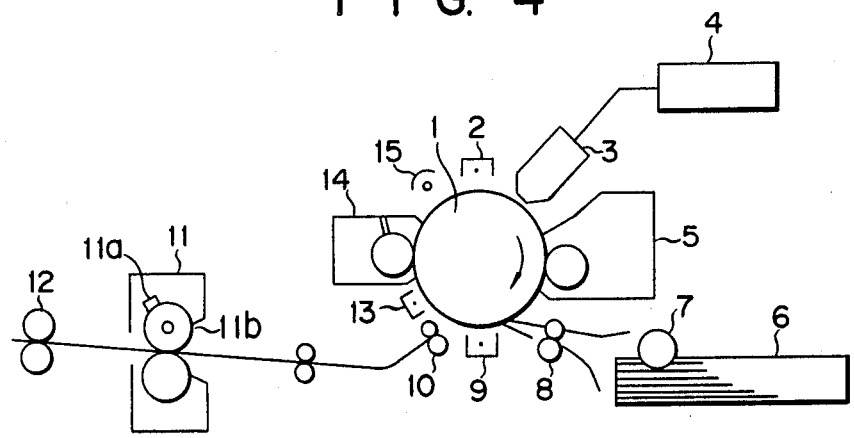
FIG. 4 is a schematic view showing a recording apparatus using a liquid crystal optical shutter.

Referring to FIG. 4, the surface of photosensitive body 1 is uniformly charged by charger 2 in advance. Liquid crystal optical shutter unit 3 is controlled by recording controller 4 for receiving recording information from recording controller 4 and controlling write timings or the like. Information is photoelectrically converted into an electrical signal, and the electrical signal is written on the surface of body 1. The resultant latent image is developed by developing unit 5 with a toner and is thus visualized. Meanwhile, transfer sheet 6 is fed by paper feed roller 7 and is stopped such that the leading end of sheet 6 is synchronized with the leading end of the toner image. The toner image is transferred from body 1 to sheet 6 by transfer charger 9. Sheet 6 is separated from body 1 by separating charger 10. The toner image on sheet 6 is then thermally fixed by fixing unit 11 the temperature of which is controlled to be constant by thermistor 11a and a fixing heater. Fixed sheet 6 is then delivered outside the apparatus by delivery rollers 12. Residual toner particles on body 1 are electrically discharged by discharger 13 and cleaned by cleaning unit 14. The surface of body 1 is then electrically discharged by eraser 15. The surface of body 1 is uniformly charged by charger 2 for the next copying cycle.

The arrangement of liquid crystal optical shutter unit 3 used in such a recording process will be described with reference to FIG. 5.

Figure 5:
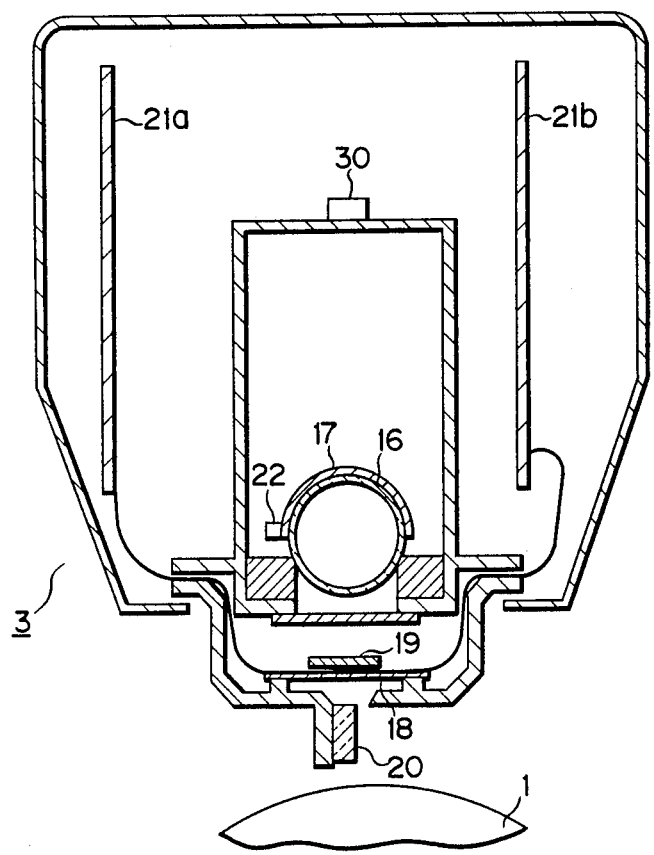
FIG. 5 is a sectional view of the liquid crystal optical shutter in FIG. 4.
Figure 6:
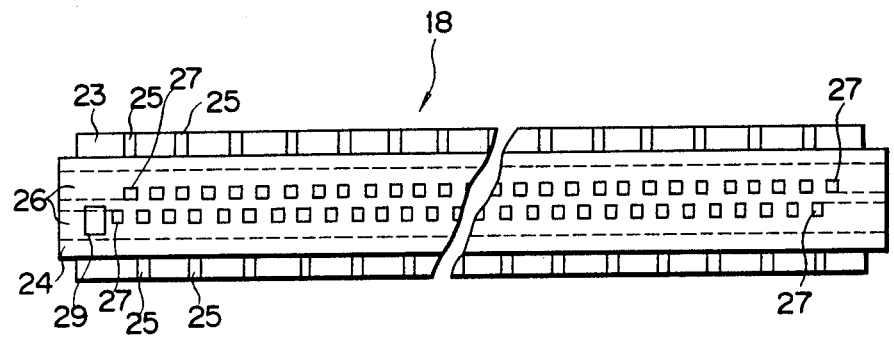
FIG. 6 is a plan view showing part of a liquid crystal optical shutter used in the present invention.
Figure 7:
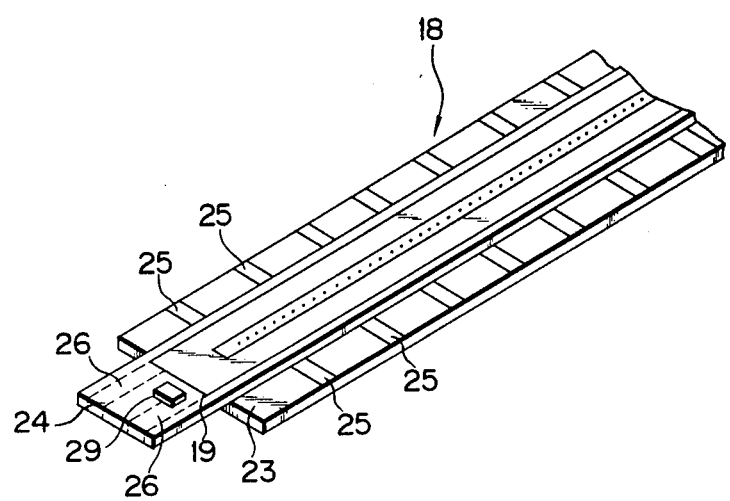
FIG. 7 is a perspective view showing part of a liquid crystal optical shutter used in the present invention.

Referring to FIG. 5, shutter unit 3 mainly includes light source 16 such as a fluorescent lamp, light source heater 17, liquid crystal optical shutter 18, liquid crystal heater 19, focusing lens 20, and control substrates 21a and 21b. Thermistor 22 is mounted at one end of heater 17 to detect its temperature. Thermistor 30 is mounted at substantially the center of shutter unit 3 to detect an ambient temperature of shutter 18. Shutter 18 comprises a Guest-Host liquid crystal optical shutter, and its construction is best shown in FIGS. 6 and 7. Referring to FIGS. 6 and 7, a liquid crystal mixture (not shown) is sealed between two glass substrates 23 and 24. Signal electrodes 25 are formed on substrate 23 at a predetermined pitch along the direction of its width and are offset from each other along its longitudinal direction.

Two common electrodes 26 are formed on glass substrate 24 in a longitudinal direction to electrodes 25. Microshutters 27 are formed by transparent electrodes of indium oxide ($In_2O_3$) and tin oxide ($SnO_2$) with a desired shape at intersections between electrodes 25 and 26. With this arrangement, at least one polarizing plate (not shown) and heater 19 are arranged on the liquid crystal panel to constitute shutter 18. Thermistor 29 is mounted on shutter 18 to detect its temperature.

Optical information writing on photosensitive body 1 is performed by applying a drive signal from substrates 21a and 21b to signal electrodes 25 and common electrodes 26 so as to control microshutters 27 of liquid crystal optical shutter 18. More specifically, body 1 is irradiated with light passing through open microshutters 27.

Figure 8:
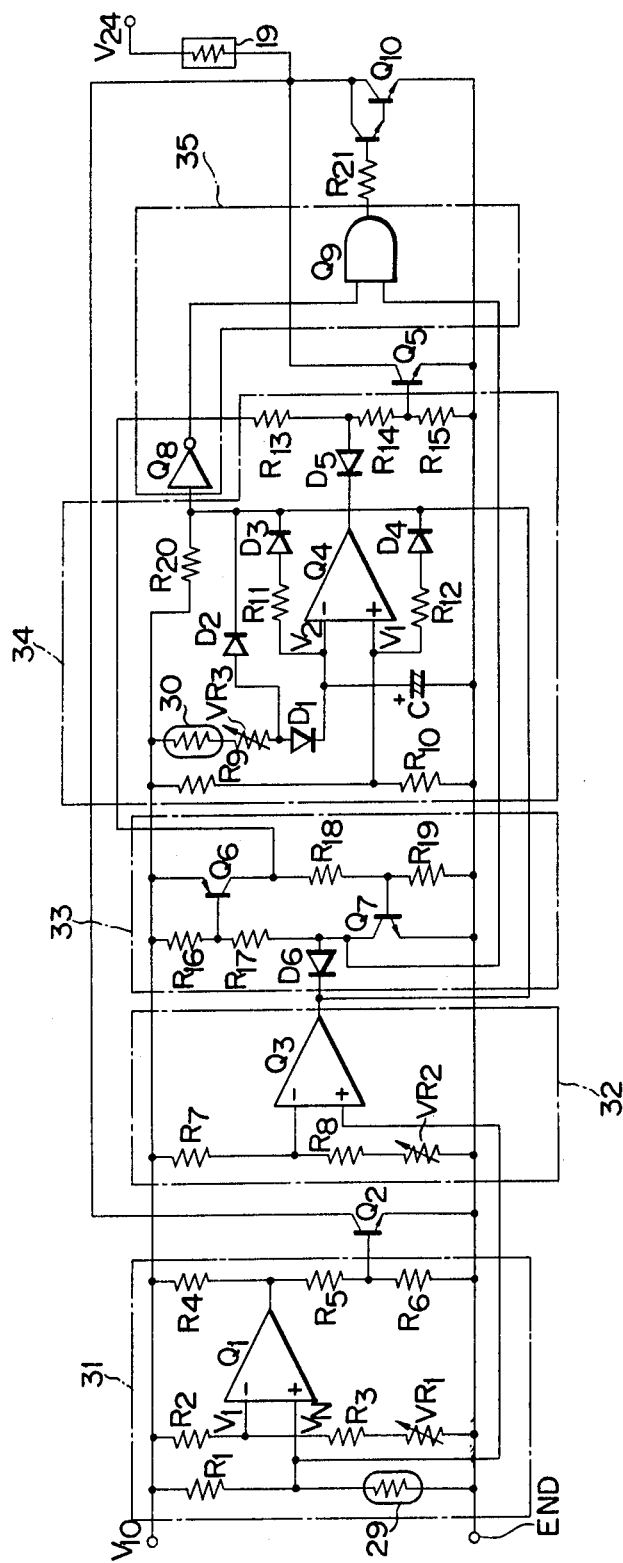
FIG. 8 is a block diagram showing a circuit arrangement of a temperature control device for a liquid crystal optical shutter.

FIG. 8 shows the temperature control device for liquid crystal optical shutter 18.

Referring to FIG. 8, reference numeral 31 denotes a heating controller for detecting a temperature of the liquid crystal optical shutter by means of thermistor 29 mounted therein and for controlling energization of heater 19 on the basis of the temperature output. In controller 31, the noninverting terminal (+input) of comparator $Q_1$ receives voltage $V_N$ obtained by causing resistor $R_1$ and thermistor 29 to divide power source voltage $V_{10}$. The inverting terminal of comparator $Q_1$ receives voltage $V_I$ obtained by causing resistors $R_2$ and $R_3$ and variable resistor $VR_1$ to divide voltage $V_{10}$. If $V_N > V_I$, then comparator $Q_1$ generates a high level output to turn on output transistor $Q_2$, thereby energizing heater 19. When the power switch of the recording apparatus is turned on, the liquid crystal optical shutter is held cooled. In this state, thermistor 29 has a high resistance, and condition $V_N > V_I$ is established to cause comparator $Q_1$ to keep high level. Transistor $Q_2$ is thus kept on to continuously energize heater 19 and heat the liquid crystal optical shutter. As shown in FIG. 9A, heating is performed under the control of heating controller 31 for time region A after energization of the apparatus. In this embodiment, the liquid crystal optical shutter is heated to 40° C. by adjusting variable resistor $VR_1$. When the temperature of the liquid crystal optical shutter exceeds 40° C., condition $V_N < V_I$ is established. As shown in FIG. 9B, the output from comparator $Q_1$ goes low to turn off transistor $Q_2$, thereby deenergizing heater 19. In this embodiment, the control system power source is a power source of 10 V represented by $V_{10}$, and the heater 19 power source is a power source of 24 V represented by $V_{24}$.

Reference numeral 32 denotes temperature limiter for deenergizing heater 19 when the temperature of the liquid crystal optical shutter exceeds a preset temperature (i.e., 45° C.). The noninverting terminal of comparator $Q_3$ receives a voltage obtained by causing resistor $R_1$ and thermistor 29 to divide the power source voltage in the same manner as in comparator $Q_1$. The inverting terminal of comparator $Q_3$ receives a voltage obtained by causing resistors $R_7$ and $R_8$ and variable resistor $VR_2$ to divide the power source voltage. When the temperature of the liquid crystal optical shutter exceeds 45° C. after the resistance of variable resistor $VR_2$ is adjusted, the output from comparator $Q_3$ goes low as shown in FIG. 9C to forcibly set the output of comparator $Q_4$ in first temperature controller 34 to be low level, thereby deenergizing heater 19 and hence performing temperature control of the liquid crystal optical shutter.

Reference numeral 33 denotes a latch circuit for holding the anode of diode $D_6$ connected to the output of comparator $Q_3$ to be low level when the output from comparator $Q_3$ goes low, i.e., when the temperature of the liquid crystal optical shutter exceeds 45° C.

When the output of comparator $Q_3$ goes low, transistors $Q_6$ and $Q_7$ constituting the latch are turned on and then kept on. The anode of diode $D_6$ holds low level. The ON signal from transistor $Q_6$ is supplied to first temperature controller 34 (to be described in detail later), and the ON signal from transistor $Q_7$ is supplied to second temperature controller 35 (to be described later).

First temperature controller 34 controls the temperature of the liquid crystal optical shutter to be the preset temperature in consideration of the ambient temperature. Controller 34 serves as a saw-tooth wave oscillator and at the same time a controller for causing thermistor 30 arranged at the center of the liquid crystal optical shutter to detect an ambient temperature and for setting the temperature of the liquid crystal optical shutter to be the preset temperature. In this embodiment, the preset temperature is 45° C. as the optimal temperature condition which allows high-speed operation of the liquid crystal optical shutter. As shown in FIG. 9A, first temperature controller 34 controls region C after the liquid crystal optical shutter reaches 45° C. This operation will be described in detail later.

The noninverting terminal of comparator $Q_4$ receives as a reference signal a voltage divided by resistors $R_9$ and $R_{10}$. The inverting terminal of comparator $Q_4$ receives an output from a time constant circuit comprising variable resistor $VR_3$ and capacitor C. Reference symbol $D_1$ denotes a diode for preventing capacitor C from being discharged toward thermistor 30. In the initial state, the voltage of capacitor C is 0 V. When the power switch is turned on, the voltage of capacitor C is exponentially increased according to the time constant of the time constant circuit. When the charging voltage exceeds reference voltage $V_2 = V_{10} \cdot [R_{10}/(R_9+R_{10})]$ determined by resistors $R_9$ and $R_{10}$, the output of comparator $Q_4$ goes low so that capacitor C is discharged through resistor $R_{11}$ and diode $D_3$. In this case, voltage $V_1$ at the noninverting terminal (reference voltage terminal) of comparator $Q_4$ is set as a voltage divided by resistor R9 and a parallel circuit of resistors $R_{10}$ and $R_{11}$ as follows:

$$V_1 = V_{10} \cdot [R/(R_9+R)]$$

for $R = R_{10} \cdot [R_{12}/(R_{10}+R_{12})]$

When the voltage of capacitor C becomes lower than $V_1$, the output of comparator $Q_4$ goes high, and the voltage of the noninverting terminal thereof is set to be $V_2$. While capacitor C is being discharged, the cathode of diode $D_2$ is set at low level. Capacitor C is not charged from thermistor 30 and variable resistor $VR_3$. Thereafter, capacitor C restarts charging. When the voltage of capacitor C exceeds $V_2$, the output of comparator $Q_4$ goes low. At this timing, capacitor C starts discharging. When the voltage of capacitor C becomes lower than $V_1$, the output of comparator $Q_4$ goes high to repeat oscillation. When the output of comparator $Q_4$ is set at high level, output transistor $Q_5$ is turned on to energize heater 19 and then heat the liquid crystal optical shutter. However, when the output of comparator $Q_4$ goes low, transistor $Q_5$ is turned off to deenergize heater 19. Since transistor $Q_6$ in latch circuit 33 is connected in series with resistor $R_{13}$ constituting a driver for transistor $Q_5$, switching of transistor $Q_5$ is controlled only when transistor $Q_6$ is turned on, as shown in FIG. 9D. Before the temperature of the liquid crystal optical shutter reaches the preset temperature, control operation of first temperature controller 34 is inhibited.

Referring to FIG. 8, a time for energizing heater 19 after the output of comparator $Q_4$ is set at high level and output transistor $Q_5$ is turned on is a time required for charging capacitor C from $V_1$ to $V_2$. This charging time is determined by the time constant of the time constant circuit. The time constant for charging capacitor C is determined by thermistor 30, variable resistor $VR_3$ and the capacitance of capacitor C. Since the ambient temperature is detected by thermistor 30, the resistance thereof is changed by the ambient temperature. Therefore, the time for energizing heater 19 after the output of comparator $Q_4$ is set at high level is changed by changes in ambient temperature.

The time required between the timing at which the output of comparator $Q_4$ is set at low level and the deenergization timing of heater 19 is a time required for decreasing the charging voltage of capacitor C from $V_2$ to $V_1$. When capacitor C is discharged, its time constant is determined by the capacitance of capacitor C and the resistance of resistor $R_{11}$. This time constant is not changed by the ambient temperature but is kept constant.

When the ambient temperature is low, thermistor 30 has a high resistance. As shown in FIG. 10A, time $TC_1$ required for charging capacitor C from $V_1$ to $V_2$ is prolonged. Time TD required for discharging capacitor C from $V_2$ to $V_1$ is predetermined. As shown in FIG. 10B, the time for setting the output of comparator $Q_4$ at high level is prolonged, and thus the energization ratio of heater 19 is increased. However, if the ambient temperature is increased, the resistance of thermistor 30 is decreased. As shown in FIG. 11A, the charging curve becomes steep. Therefore, charging time $TC_2$ of capacitor C from $V_1$ to $V_2$ is shortened. As shown in FIG. 11B, the time for setting the output of comparator $Q_4$ at high level is shortened. Since low level retention time TD is predetermined, the energization ratio of heater 19 is decreased. In this manner, when the ambient temperature is changed, the change causes a change in energization time of heater 19. The deenergization time of the heater 19 is predetermined, so that the energization ratio [TC/(TD+TC)] of heater 19 is changed as an analog value according to changes in temperature. More specifically, when the ambient temperature is low, heat dissipation is active and the heater is maintained at the preset temperature at a high energization ratio. However, when the ambient temperature is high, heat dissipation becomes passive and heater 19 is kept at the preset temperature at a low energization ratio. The ambient temperature of the liquid crystal optical shutter is detected by thermistor 30 for every oscillation cycle of first temperature controller 34. A detected value is fed back to first temperature controller 34 every predetermined interval. As compared with the conventional arrangement, control precision can be improved. As shown in FIG. 9A, stable temperature control can be performed without being influenced by the ambient temperature.

Second temperature controller 35 controls time region B of FIG. 9A, i.e., a time region until the temperature of the liquid crystal optical shutter reaches 45° C. after the liquid crystal optical shutter is heated by thermistor 29 in heating controller 31.

Second temperature controller 35 comprises inverter $Q_8$ for inverting the output from comparator $Q_4$ in first temperature controller 34, and AND gate $Q_9$ for producing a logical product of an output from inverter $Q_8$ and an output from transistor $Q_7$ in latch circuit 33. Since transistor $Q_7$ in latch circuit 33 is kept on when the temperature of the liquid crystal optical shutter reaches 45° C., an output from AND gate $Q_9$ is set at low level (FIG. 9E) under the condition wherein the temperature of the liquid crystal optical shutter reaches the preset temperature of 45° C. Transistor $Q_{10}$ controlled in response to the output from second temperature controller 35 is operated at a temperature of 45° C. or less. Switching operation of transistor $Q_{10}$ is inhibited at a temperature of 45° C. or more.

First temperature controller 34 is started when the power switch is turned on. The output from comparator $Q_4$ is changed by the ambient temperature detected by thermistor 30.

Figure 9:
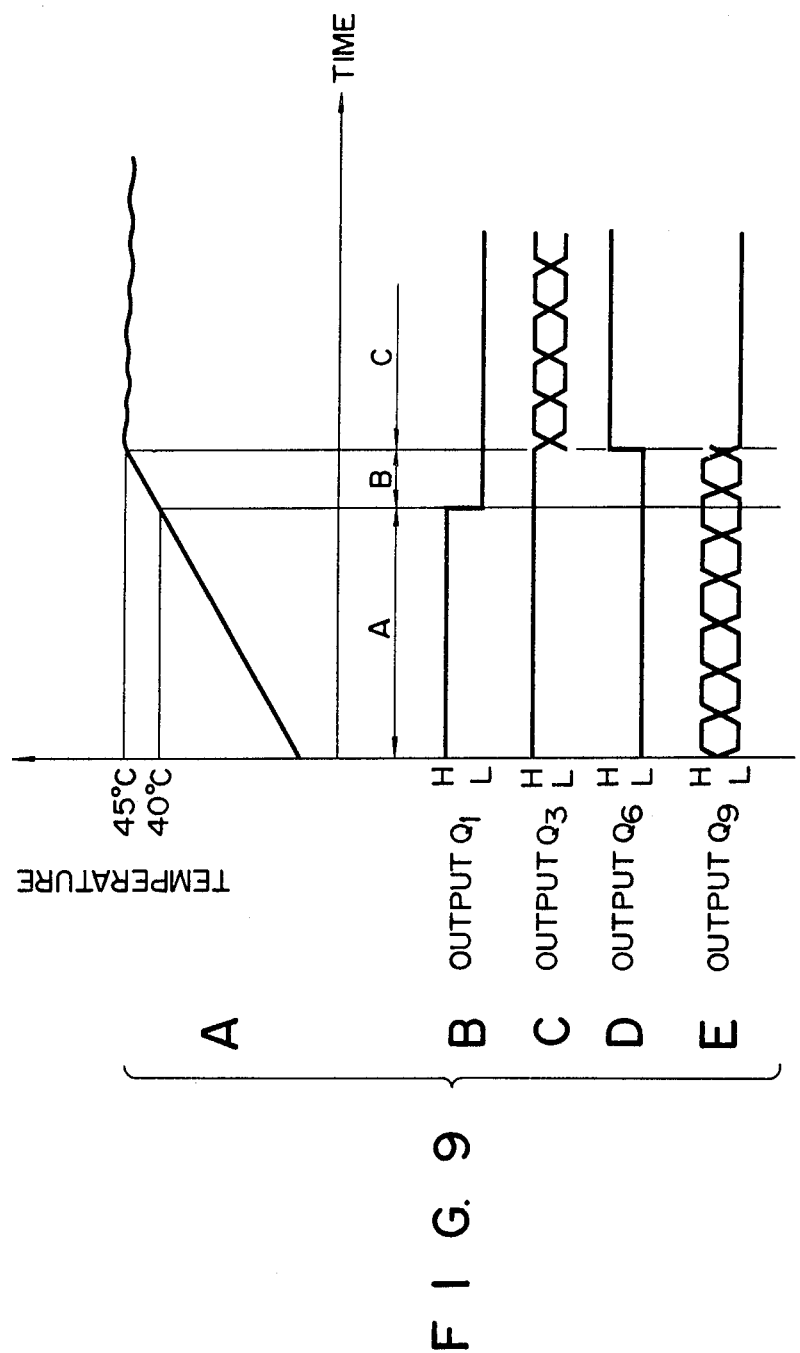
FIGS. 9A to 9E are timing charts showing the operation of the circuit arrangement in FIG. 8.

In region A of FIG. 9A, output transistor $Q_2$ connected to heating controller 31 is kept on, and temperature controller 34 does not perform control operation. In this case, although the liquid crystal optical shutter itself is heated by heater 19, its ambient temperature is still low, and the resistance of thermistor 30 is high. The output from first temperature controller 34 prolongs the energization time of heater 19 to increase the energization ratio. However, since the output from AND gate $Q_9$ in second temperature controller 35 is opposite the output from first temperature controller 34 since the output from comparator $Q_4$ is inverted by inverter $Q_8$. The energization time of heater 19 is deenergization time TD of controller 34. However, the deenergization time is prolonged since the resistance of thermistor 30 is high, so that the energization ratio of controller 35 is TD/(TC+TD) and the energization ratio of heater 19 is decreased. If the ambient temperature is low, output transistor $Q_{10}$ is turned on to set energization time TD of heater 19 to be constant within the control operation range of the second temperature controller 35. Deenergization time $TC_3$ is prolonged to decrease the energization ratio. Output transistor $Q_5$ is on while first temperature controller 34 is operating for period B (FIG. 9). Hence, the time $TC_3$ of supplying current to heater 19 becomes longer, and deenergization time TD becomes constant, thereby increasing the energization ratio. As a result, the energization ratio is scarcely affected by the ambinent temperature. FIG. 12B shows the case wherein the ambient temperature is high. As compared with the case in FIG. 12A, region D has a high energization ratio, and region E has a low energization ratio. In this manner, the energization ratio is forcibly controlled on the basis of the ambient temperature before the temperature of the liquid crystal optical shutter reaches the preset temperature. Therefore, the liquid crystal optical shutter is gradually heated at an optimal energization ratio. This indicates that overshooting caused by rapid heating upon energization of the recording apparatus can be completely prevented.

Thereafter, when the temperature of the liquid crystal optical shutter reaches the preset temperature of 45° C., the output from comparator $Q_3$ in temperature limiter 32 goes low, as shown in FIG. 9C. As shown in FIG. 9E, the output from AND gate $Q_9$ goes low to turn off transistor $Q_{10}$, thereby stopping the operation of second temperature controller 35. After the temperature of the liquid crystal optical shutter reaches the preset temperature, controller 34 controls the energization ratio of heater 19 in response to an output from thermistor 30 for detecting the ambient temperature, as indicated by E in FIG. 12B, thereby controlling the temperature of the shutter to the preset temperature.

When the power switch of the recording apparatus is turned on, heater 19 is continuously energized under the control of heating controller 31 until the temperature of the liquid crystal optical shutter reaches about 40° C. The shutter can be heated in a short period of time. The energization ratio of the heater is decreased by second temperature controller 35 before the temperature of the shutter reaches the preset temperature. Therefore, overshooting caused by rapid heating of the liquid crystal optical shutter can be completely prevented, and the warm-up time can be shortened accordingly. After the temperature of the shutter reaches the preset temperature (i.e., 45° C.), fine adjustment is performed by first temperature controller 34 as described above. If the temperature exceeds the preset temperature, energization of heater 19 is forcibly interrupted by temperature limiter 32. Therefore, the temperature of the liquid crystal optical shutter can be maintained at a stable temperature. The dynamic characteristics, i.e., the opening of the shutter, can be stabilized, and a nonuniform latent potential for optically writing information on the photosensitive body can be prevented. Therefore, variations in image density during development can be thus prevented.

In the above embodiment, the deenergization time of the heater is predetermined and the energization time of the heater is changed according to changes in ambient temperature, and vice versa. However, these times may be indentical, and the energization time of the heater may be changed according to changes in temperature.

What is claimed is:

1. A temperature control device for a liquid crystal optical shutter in a recording apparatus, comprising:
    a heater energization control means for receiving a power source voltage, detecting a temperature of said liquid crystal optical shutter, and controlling energization of a heater in said liquid crystal optical shutter according to a detected temperature until said liquid crystal optical shutter reaches a predetermined temperature;
    a temperature limiting means for receiving the power source voltage and deenergizing said heater when the temperature of said liquid crystal optical shutter exceeds a preset temperature;
    a first temperature controlling means connected to said temperature limiting means, for detecting an ambient temperature on the basis of a signal from a temperature detector arranged near said liquid crystal optical shutter and for controlling to deenergize said heater in a temperature region exceeding the preset temperature; and
    a second temperature controlling means, connected to said first temperature controlling means, and for generating a control output to prevent energization of said heater when the temperature of said liquid crystal optical shutter exceeds the preset temperature.

2. A device according to claim 1, further comprising a latching circuit connected between said temperature limiting means and said first temperature controlling means, for latching a deenergizing state of said heater when the temperature of said liquid crystal optical shutter exceeds the preset temperature.

3. A device according to claim 1, further comprising an inverting circuit connected between said first temperature controlling means and said second temperature controlling means, for inverting the output supplied from said first temperature controlling means.

4. A device according to claim 2, wherein said latching circuit is connected to said second temperature controlling means.

5. A device according to claim 1, wherein said heater energization control means includes a thermistor, arranged near said liquid crystal optical shutter, for detecting a temperature of said liquid crystal optical shutter.

6. A device according to claim 1, wherein said first temperature controlling means comprises an oscillator including a thermistor for detecting an ambient temperature of said liquid crystal optical shutter and a time constant circuit, said oscillator being operated dependent on the ambient temperature.

7. A device according to claim 1, wherein said first temperature controlling means changes an energization ratio of said heater according to an output from said temperature detector which detects a temperature near said liquid crystal optical shutter.

8. A device according to claim 7, wherein said first temperature controlling means controls the energization ratio such that a value of the energization ratio of said heater at a low temperature near said liquid crystal optical shutter is lower than that at a high temperature near said liquid crystal optical shutter.

9. A device according to claim 1, wherein said second temperature controlling means controls the energization ratio such that a value of the energization ratio of said heater is different from that under the control of said first temperature controlling means.

10. A device according to claim 9, wherein said second temperature controlling means controls the energization ratio such that a value of the energization ratio of said heater at a high temperature near said liquid crystal optical shutter is higher than that at a low temperature near said liquid crystal optical shutter.

11. A device according to claim 7, wherein said first temperature controlling means includes a series circuit of a thermistor and a capacitor, and the energization ratio is determined by a time constant of said thermistor and said capacitor.

12. A device according to claim 11, wherein said capacitor determines an energization time of said heater according to a charging time thereof.

13. A device according to claim 11, wherein said capacitor determines an energization time of said heater according to a discharging time thereof.

* * * * *